United States Patent [19]
Ozaki

[11] Patent Number: 6,148,319
[45] Date of Patent: *Nov. 14, 2000

[54] MULTIPLIER

[75] Inventor: Yasushi Ozaki, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,872

[22] Filed: Jan. 9, 1998

[30] Foreign Application Priority Data

Jan. 10, 1997 [JP] Japan ................................. 9-014536

[51] Int. Cl.[7] ................................. G06F 7/52; G06F 7/38
[52] U.S. Cl. ........................................... 708/625; 708/550
[58] Field of Search .................................. 708/550, 551, 708/552, 553, 496, 497, 498, 499, 503, 505, 603, 620, 625, 626, 627, 628, 629, 630, 631, 632

[56] References Cited

U.S. PATENT DOCUMENTS

| | | | |
|---|---|---|---|
| 5,521,855 | 5/1996 | Yamazaki | 708/628 |
| 5,796,645 | 8/1998 | Peh et al. | 708/603 |

FOREIGN PATENT DOCUMENTS 6-274317  9/1994  Japan .

*Primary Examiner*—Chuong Dinh Ngo
*Attorney, Agent, or Firm*—Ostrolenk, Faber, Gerb & Soffen, LLP

[57] ABSTRACT

There is disclosed a multiplier having a digit rounding function which operates by selecting an added value for rounding a digit in the process of adding partial products, thereby reducing a circuit magnitude and realizing a high-speed operation. A multiplier 13 is provided with selection circuits 18, 19 and 1A which can switch values of the partial products obtained in a secondary Booth algorithm in response to a signal for controlling the presence of the digit rounding function.

2 Claims, 6 Drawing Sheets

MULTIPLIER

BACKGROUND OF THE INVENTION

1. Field of the Invention

The present invention relates to a multiplier, particularly to a multiplier which has a digit rounding function.

2. Description of the Prior Arts

A conventional multiplier having a digit rounding function is now described with reference to FIG. 1. FIG. 1 shows a constitution of a prior-art multiplier (arithmetic operator) with a digit rounding function. As shown in FIG. 1, a multiplier 63 multiplies X61 and Y62 which represent two's complement numbers of 16 bits. In accordance with a value of a digit rounding selection signal 66, a selection circuit 65 emits a 32-bit output "00008000" or "00000000" (hexadecimal indication). An adder 64 adds the output (32 bits) of the multiplier 63 and the output of the selection circuit 65.

To round a digit of a multiplication result, the multiplier 63 obtains a result of multiplication of inputs X61 and Y62, the selection circuit 65 selects the 32-bit output "00008000" (hexadecimal indication, i.e., the 16th bit from an MSB side is "1"), and the adder 64 adds the output of the multiplier 63 and the output of the selection circuit 65, so that the digit rounding operation of the multiplication result is performed.

On the other hand, when X and Y in two's complement numbers of 16 bits are only multiplied, the multiplier 63 obtains the multiplication result of the inputs X61 and Y62, the selection circuit 65 selects the 32-bit output "00000000" (hexadecimal indication) in response to the digit rounding selection signal 66, and the adder 64 adds the output of the multiplier 63 and the output of the selection circuit 65 to emit an operation result.

As aforementioned, in the prior art, for the digit rounding operation of the multiplication result, the multiplication result is once obtained, and "1" is added to a certain bit in the multiplication result, to round the digit.

Therefore, in addition to the multiplier 63, the adder 64 is necessary. After obtaining the multiplication result, addition is performed for the digit rounding. Such operation takes a longer time than the multiplication only.

SUMMARY OF THE INVENTION

Wherefore, an object of the invention is to provide a multiplier which operates by selecting an added value for digit rounding in the process of adding partial products to reduce a circuit magnitude and achieve a high-speed operation.

To attain this and other objects, the invention provides a multiplier with a function of rounding a digit of a multiplication result which comprises a means for adding partial products obtained from a secondary Booth algorithm and a means for switching values to be added as the partial products in response to a signal for controlling the presence of the digit rounding function.

DETAILED DESCRIPTION OF THE PREFERRED EMBODIMENTS

The invention will now be described by way of an embodiment. In the preferred embodiment of the invention, a multiplier is provided with selection circuits (18, 19 and 1A in FIG. 5) which can switch values of partial products obtained by means of a secondary Booth algorithm in accordance with a signal for controlling the presence of a digit rounding function.

In the embodiment, at the time of adding the partial products obtained by the secondary Booth algorithm, a digit rounding operation is simultaneously performed. Therefore, different from the prior art, the adder for the digit rounding operation separate from the multiplier is unnecessary. A circuit magnitude is reduced, and a high-speed operation can be achieved. The embodiment is now detailed with reference to the accompanying drawings.

Figure 1:
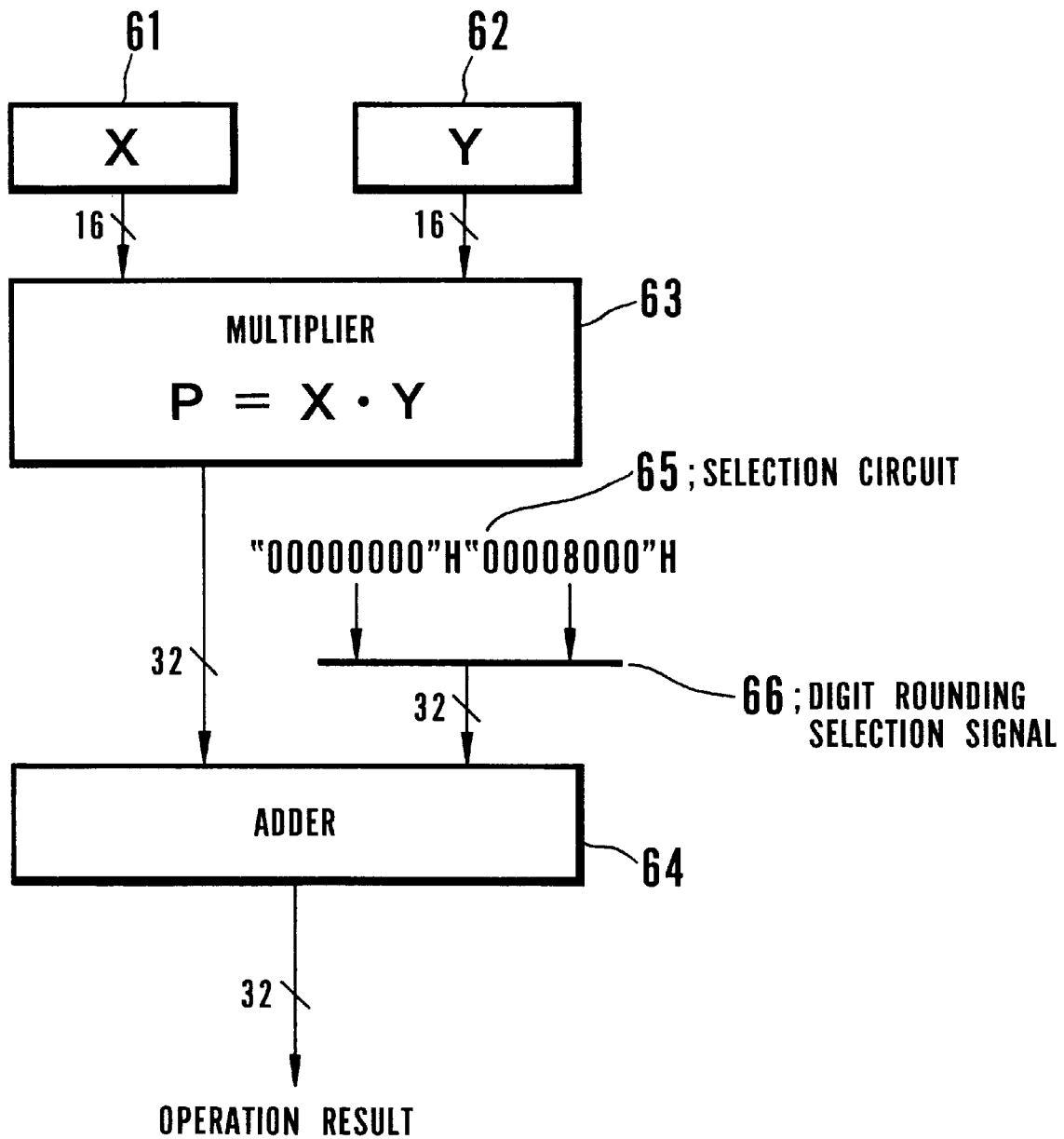
FIG. 1 is a block diagram showing a constitution of a prior-art multiplier which has a digit rounding function.
Figure 2:
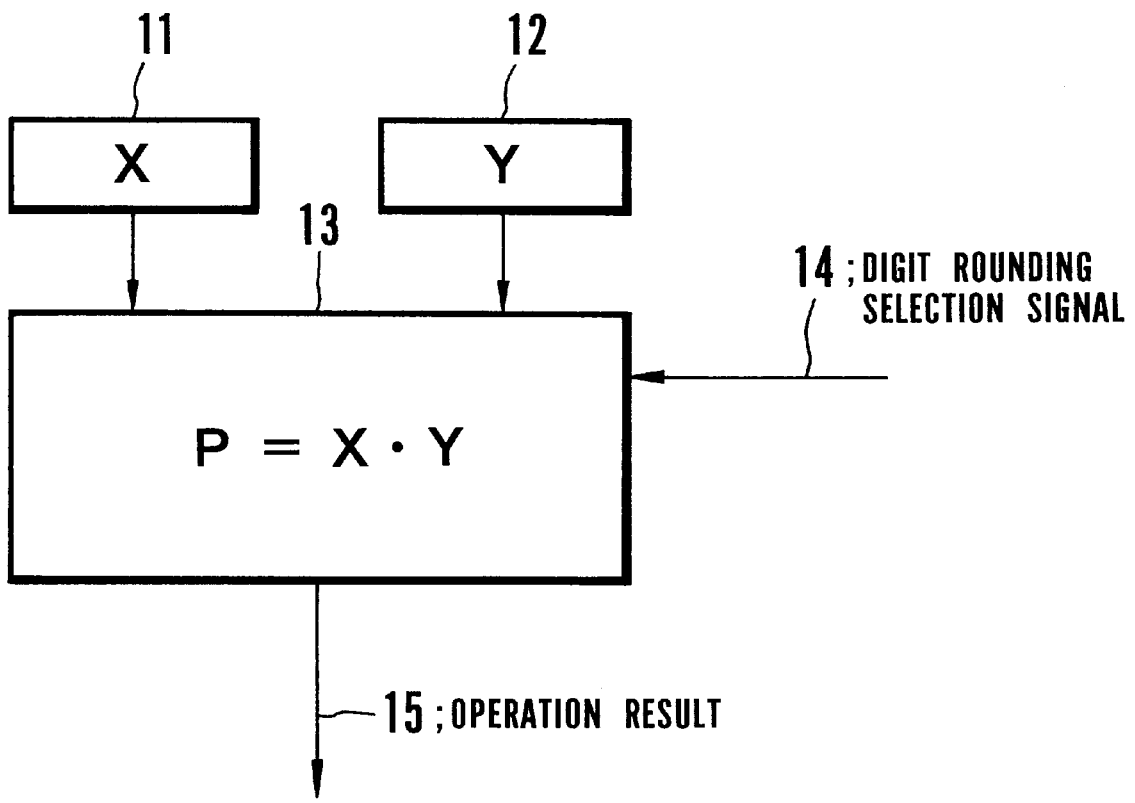
FIG. 2 is a block diagram showing a constitution embodying the invention.
Figure 3:
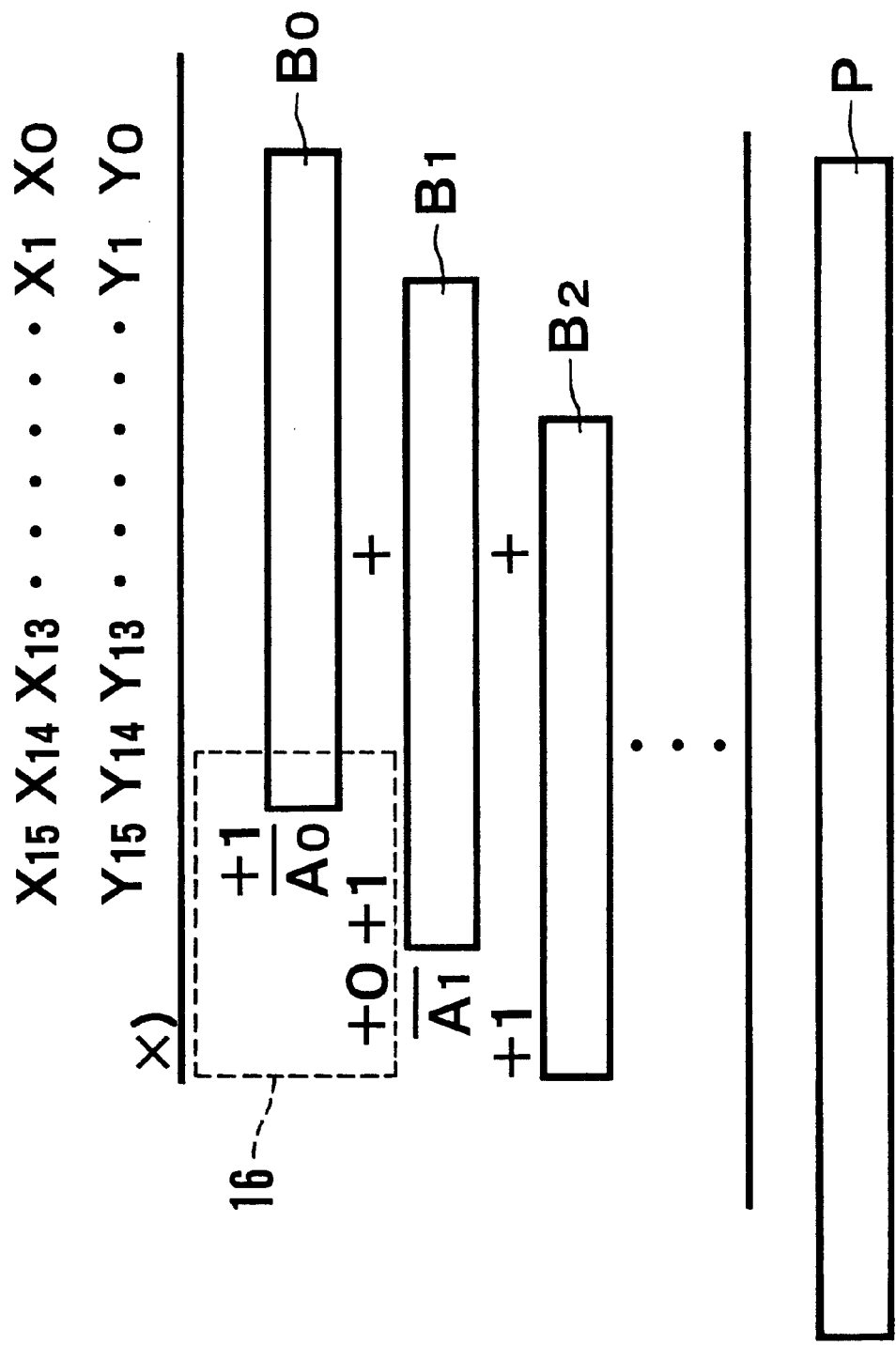
FIG. 3 is an explanatory view showing a structure of an operation in a multiplier embodying the invention.
Figure 4:
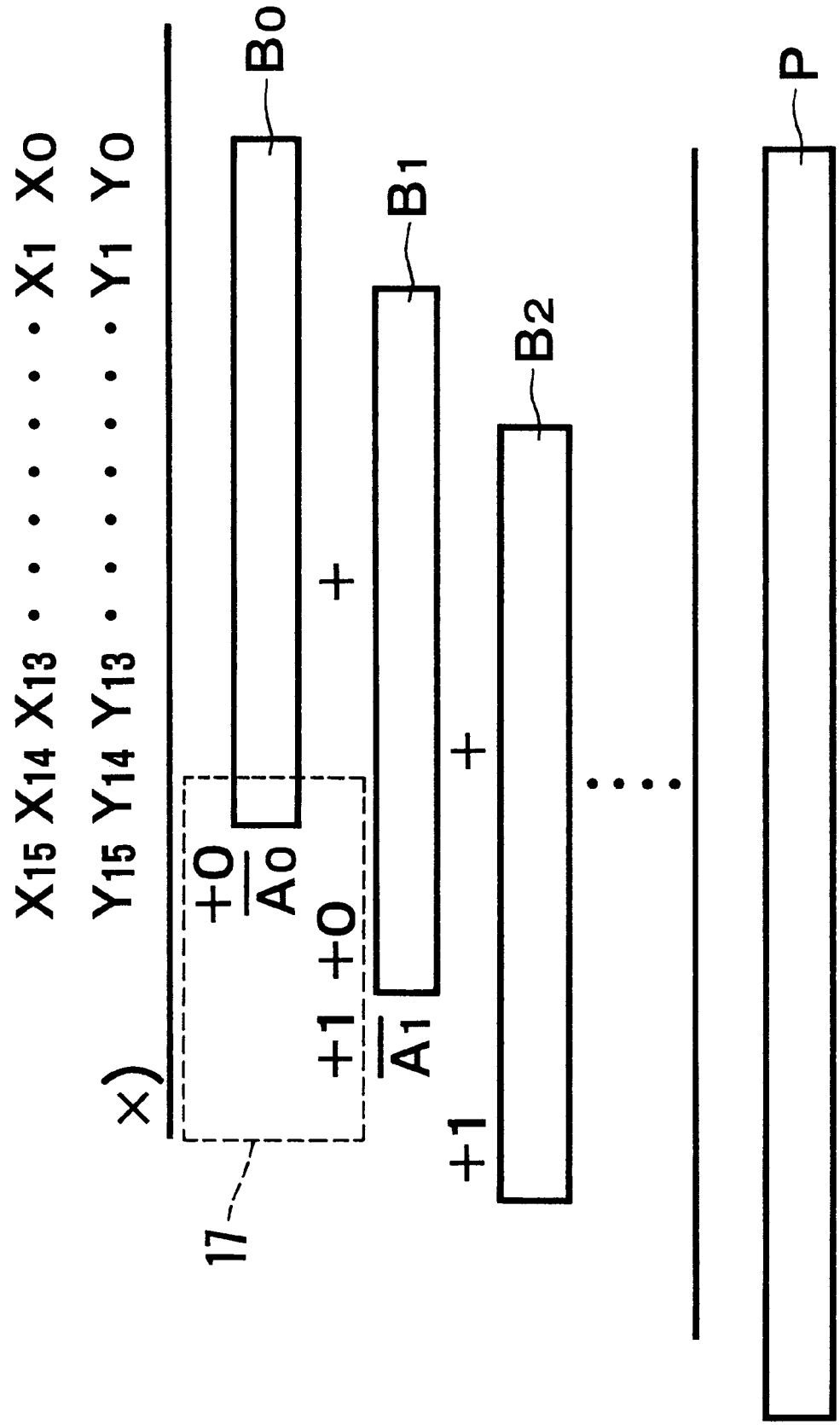
FIG. 4 is an explanatory view showing a structure of an operation in a multiplier embodying the invention.
Figure 5:
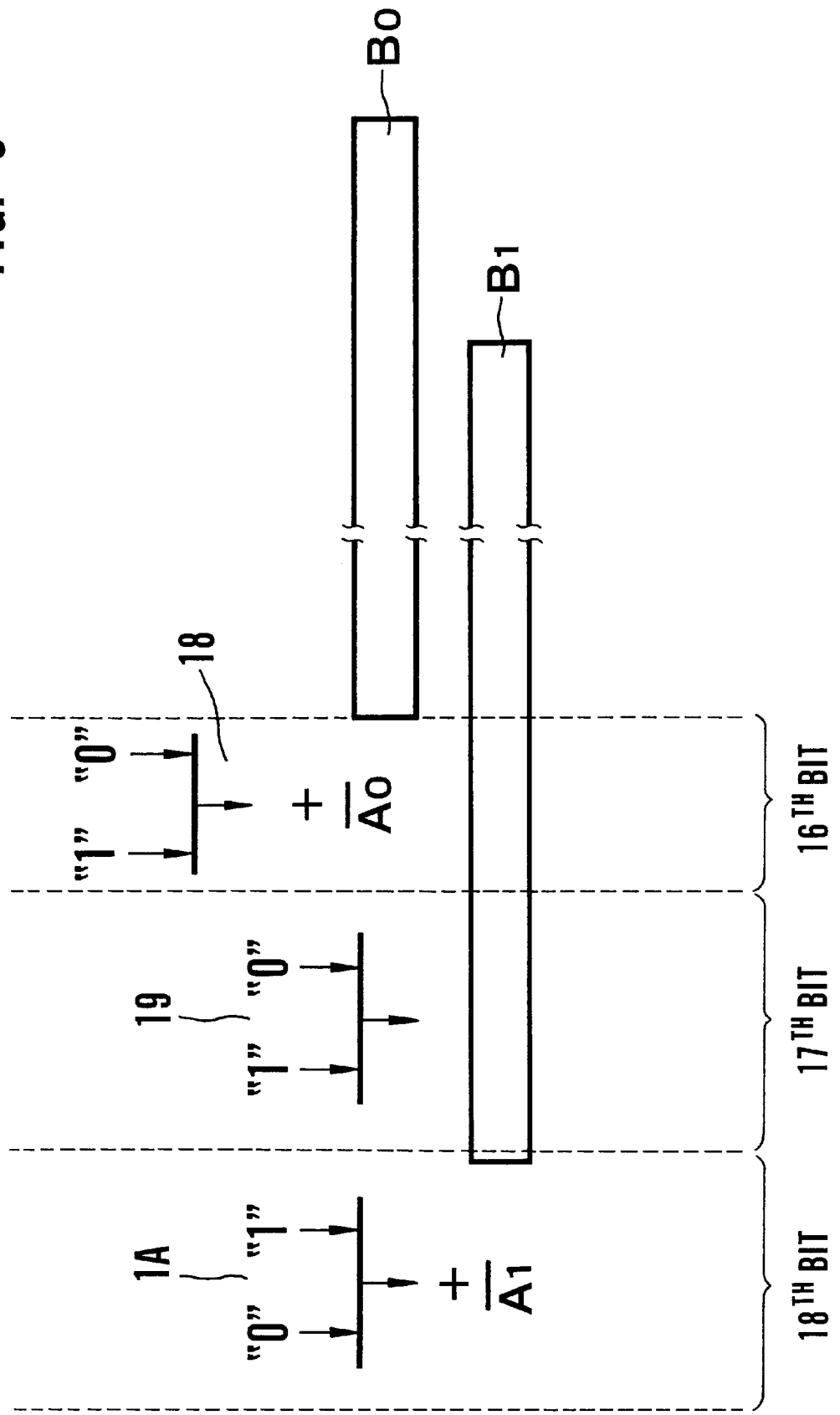
FIG. 5 is an explanatory view showing a structure of an operation in a multiplier embodying the invention.

FIG. 2 is a block diagram showing a constitution of the embodiment, and FIGS. 3, 4 and 5 are explanatory views showing a structure of operation in the multiplier according to the embodiment.

In FIG. 2, inputs X11 and Y12 are two's complement numbers of 16 bits, respectively. Numeral 13 denotes a multiplier with a digit rounding function, and 14 denotes a digit rounding selection signal. Also in FIG. 5, numerals 18, 19 and 1A denote selection circuits which receive the digit rounding selection signal (14 in FIG. 2) as a selection control signal.

First, multiplication of the two's complement numbers X and Y of 16 bits by using the secondary Booth algorithm is described.

A multiplicand X and a multiplier Y are expressed in following expressions (1) and (2).

$$X = -x_{15} \cdot 2^{15} + \sum_{i=0}^{14} x_i \cdot 2^i \tag{1}$$

$$Y = -y_{15} \cdot 2^{15} + \sum_{j=0}^{14} y_j \cdot 2^j \tag{2}$$

By using an expression (3) of the secondary Booth algorithm, the multiplier Y in the above (2) is arranged, then can be expressed in following (4).

$$Ej = -2y_{2j+1} + y_{2j} + y_{2j-1} \tag{3}$$

provided that $y_{-1} = 0$ $$Y = \sum_{j=0}^{7} E_j \cdot 2^{2j} \tag{4}$$

Therefore, a multiplication P of X and Y is expressed in following (5).

$$P = X \cdot Y \quad (5)$$

$$= \left(-x_{15} \cdot 2^{15} + \sum_{i=0}^{14} x_i \cdot 2^i\right) \cdot \sum_{j=0}^{7} E_j \cdot 2^{2j}$$

$$= \sum_{j=0}^{7}(-x_{15} \cdot 2^{15}) \cdot E_j \cdot 2^{2j} + \sum_{j=0}^{7}\left(\sum_{i=0}^{14} x_j \cdot 2^i\right) \cdot E_j \cdot 2^{2j}$$

Here, $$A_j = X_{15} \cdot E_j, \; B_j = \left(\sum_{i=0}^{14} x_i \cdot 2^i\right) E_j$$

Then, P in the above (5) is expressed in following (6) ($P=P_1+P_2$), and $P_1$ and $P_2$ are expressed in following (7) and (8), respectively.

$$P = \sum_{j=0}^{7}(-A_j \cdot 2^{15}) \cdot 2^{2j} + \sum_{j=0}^{7} B_j \cdot 2^{2j} = P_1 + P_2 \quad (6)$$

$$P_2 = \sum_{j=0}^{7} B_j \cdot 2^{2j} \quad (7)$$

$$P_1 = \sum_{j=0}^{7}(-A_j \cdot 2^{15}) \cdot 2^{2j} \quad (8)$$

$$-A_j \cdot 2^n = -2^{n+1} + \overline{A}_j \cdot 2^n + 2^n \quad (9)$$

(provided that, $\overline{A}$ means negation (reverse) of A), then $P_1$ in the above (7) is expressed in following (10).

$$P_1 = \sum_{j=0}^{7}(-2^{16} + \overline{A}_j \cdot 2^{15} + 2^{15}) \cdot 2^{2j} \quad (10)$$

$$= -2^{30} + \overline{A}_7 \cdot 2^{29} + 2^{29} - 2^{28} + \overline{A}_6 \cdot 2^{27} + \cdots + 2^{15}$$

$$= -2^{30} + \overline{A}_7 \cdot 2^{29} + 2^{28} + \overline{A}_6 \cdot 2^{27} + \cdots + \overline{A}_0 \cdot 2^{15} + 2^{15}$$

Also, $P_2$ in the above (8) can be expressed in following (11).

$$P_2 = \sum_{j=0}^{7} B_j \cdot 2^{2j} \quad (11)$$

$$= B_7 \cdot 2^{14} + B_6 \cdot 2^{12} + \cdots + B_1 \cdot 2^2 + B_0 \cdot 2^0$$

Therefore, the multiplication result of X and Y, $P=X \cdot Y$ is expressed in the above (10) and (11).

Figure 6:
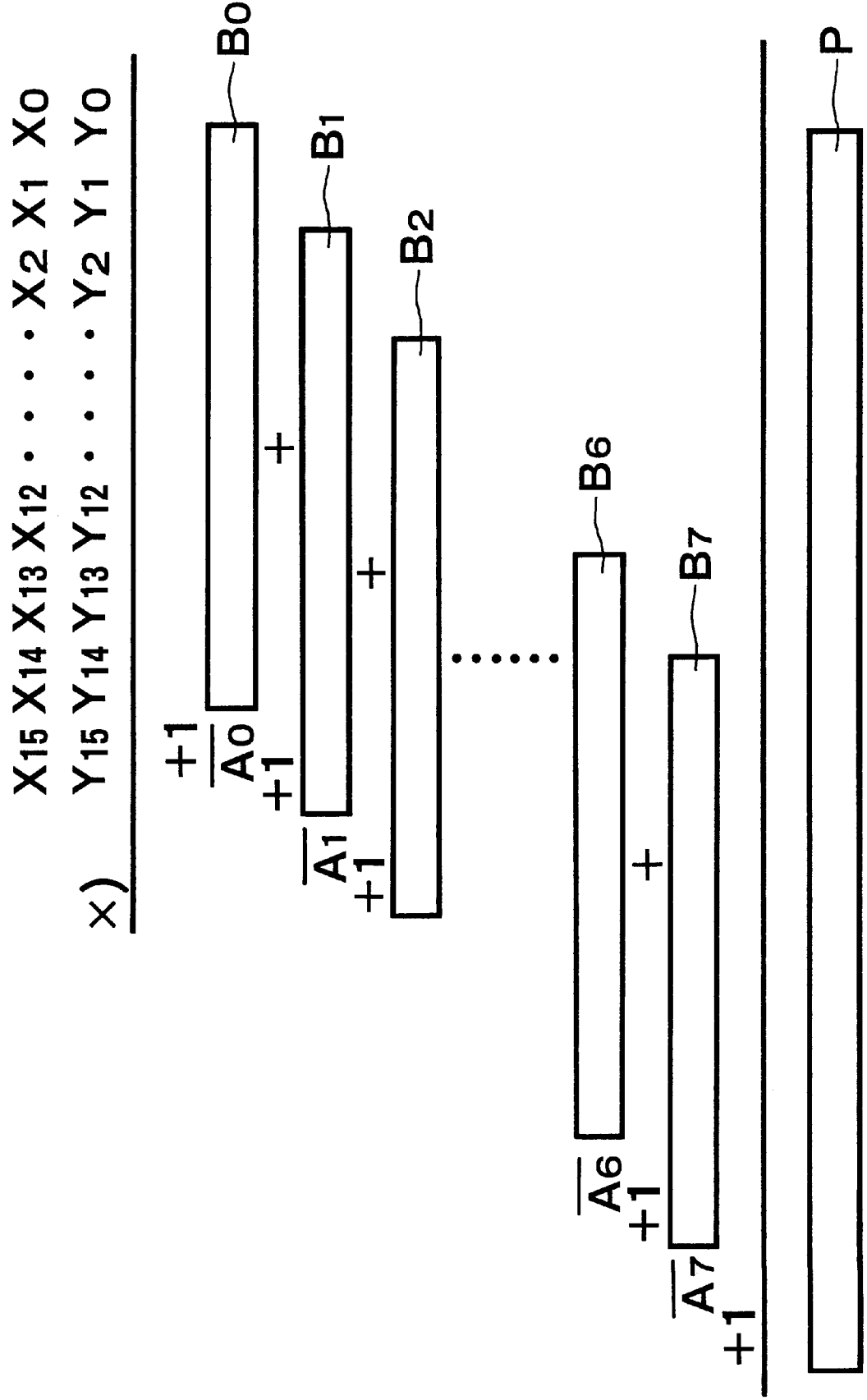
FIG. 6 is an explanatory view showing a process of adding partial products which are obtained by using a secondary Booth algorithm in an embodiment according to the invention.

FIG. 6 shows the multiplication $X \cdot Y$ by means of the partial product addition in the expressions (10) and (11). In FIG. 6, $B_0$ to $B_7$ correspond to $B_0$ to $B_7$ in the expression (11). For example, "$A_0$" and "+1" placed on the left of MSB of $B_0$ (the 16th bit=$2^{15}$) correspond to the addition ($\overline{A}_0 2^{15} + 2^{15}$) in the expression (10). Also, $B_1$ shifts toward the left by two bits from $B_0$. The addition of these partial products results in a multiplied value P on the bottom of FIG. 6.

As an embodiment of the invention, a multiplier having a function of rounding the 16th bit digit of a multiplication results.

To round the 16th bit digit, "1" is just added to the 16th bit of the multiplication result. Therefore, if "1" is added to the 16th bit (the bit position of $2^{15}$) in FIG. 3, the same result can be obtained. Specifically, to perform the digit rounding or not to perform the digit rounding, the added value obtained from the expression (10), i.e., ($\overline{A}_7$ to $\overline{A}_0$, +1) may be switched.

FIG. 3 shows a structure of multiplication in which digit rounding is not performed, while FIG. 4 shows a structure of multiplication in which digit rounding is performed. They differ in the added value for each bit in portions 16 and 17 surrounded by dotted lines. Specifically, as shown in FIG. 3, in the same manner as in FIG. 6, as the added values obtained from the expression (10), ($\overline{A}_0$, +1) is set in the 16th bit (=$2^{15}$), +1 is set in the 17th bit, and ($\overline{A}_1$, 0) is set in the 18th bit. On the other hand, when the digit rounding function is effective, as shown in FIG. 4, as a result of adding "1" to the 16th bit, as the added values, ($\overline{A}_0$, 0) is set in the 16th bit, 0 is set in the 17th bit, and ($\overline{A}_1$, +1) is set in the 18th bit.

Therefore, as shown in FIG. 5, when the digit rounding of the multiplication result is not performed, in response to the digit rounding selection signal 14, the 16th bit selection circuit 18 and the 17th bit selection circuit 19 both select "1", while the 18th bit selection circuit 1A selects "0" for the operation.

On the other hand, when the digit rounding of the multiplication result is performed, in response to the digit rounding selection signal 14, the 16th bit selection circuit 18 and the 17th bit selection circuit 19 both select "0", while the 18th bit selection circuit 1A selects "1" for the operation.

It is therefore understood that by switching the values of partial products obtained by means of the secondary Booth algorithm in response to the digit rounding selection signal, the digit rounding of the operation result can be easily done.

In the embodiment, the multiplication of two's complement numbers of 16 bits has been described. However, the present invention is not restricted to the aforementioned embodiment, and can include various modifications within the scope of the invention.

As aforementioned, according to the invention, the multiplier is constituted in such a manner that when the partial products obtained in the secondary Booth algorithm are added, the digit rounding is simultaneously performed, thereby obviating the necessity of a separate adder for the digit rounding operation. Also, a high-speed operation can be realized.

According to the invention, for example, in the case of the multiplication of 16 bits×16 bits with the digit rounding, a full adder for 32 bits, which has been hereto-fore required, is unnecessary. The time required for the addition of 32 bits plus 32 bits can be saved.

What is claimed is:

1. A multiplier with a function of rounding a digit multiplication result which comprises:

means for adding partial products of binary bits obtained in secondary Booth algorithm; and means for switching the binary values "1" and "0" to be added to predetermined bit positions of said partial products in accordance with a control signal for controlling the digit founding function, said switching means including a first selection circuit provided for the bit $A_0$ to the left of the MSB (most significant bit) of a partial product $B_0$, a second selection circuit provided for the bit position of the MSB of a partial product $B_1$ and a third selection circuit provided for the bit $A_1$ to the left of the MSB of said partial product $B_1$, wherein, when the digit rounding function is instructed, said first and second selection circuits select "0" and said third selection circuit selects "1" according to a digit rounding signal, and "0" selected by said first selection circuit is added to $A_0$ of said partial product $B_0$, "0" selected by said second selection circuit is added to the MSB of said partial product $B_1$ and "1" selected by said third selection circuit is added to $A_1$ of said partial product $B_1$, thus performing the rounding operation while adding the partial products.

2. A multiplier according to claim 1, wherein when the digit rounding function is not instructed, said first and second selection circuits select "1" and said third selection circuits selects "0", and "1" selected by said first selection circuit is added to $A_0$ of said partial product $B_0$, "1" selected by said second selection circuit is added to the MSB of said partial product $B_1$ and "0" selected by said third selection circuit is added to $A_1$ of said partial product $B_1$.

* * * * *